United States Patent [19]

Tanaka et al.

[11] Patent Number: 4,934,836

[45] Date of Patent: Jun. 19, 1990

[54] DYNAMIC PRESSURE TYPE FLUID BEARING DEVICE

[75] Inventors: Katsuhiko Tanaka, Yamato; Ikunori Sakatani; Takeyuki Yoshiba, both of Fujisawa; Takanobu Sato, Odawara; Kiyoshi Haginuma; Toshimi Takajou, both of Fujisawa; Hiromi Sugi, Ayase, all of Japan

[73] Assignee: Nippon Seiko Kabushiki Kaisha, Tokyo, Japan

[21] Appl. No.: 393,700

[22] Filed: Aug. 14, 1989

[30] Foreign Application Priority Data

Aug. 18, 1988 [JP] Japan ................... 63-205220
Aug. 24, 1988 [JP] Japan ................... 63-209777
Nov. 24, 1988 [JP] Japan ................... 63-297054

[51] Int. Cl.$^5$ ............................................. F16C 32/06
[52] U.S. Cl. .................................... 384/100; 350/6.7; 384/107; 384/111; 384/113
[58] Field of Search ................. 384/99, 100, 107–109, 384/111–113, 115, 118, 121, 123, 368, 372, 373, 397; 350/6.5–6.8; 310/90

[56] References Cited

U.S. PATENT DOCUMENTS

| | | | |
|---|---|---|---|
| 4,200,344 | 4/1980 | Binns et al. ................... | 384/107 |
| 4,443,043 | 4/1984 | Yamaguchi ................... | 350/6.5 X |
| 4,487,514 | 12/1984 | Mari ................... | 384/113 |
| 4,523,800 | 6/1985 | Yamashita ................... | 384/115 X |
| 4,547,081 | 10/1985 | Tanaka et al. ................... | 384/107 |
| 4,652,149 | 3/1987 | Nakaoka et al. ................... | 384/100 |
| 4,797,009 | 1/1989 | Yamazaki ................... | 384/100 |
| 4,805,972 | 2/1989 | Tanaka et al. ................... | 384/107 X |

FOREIGN PATENT DOCUMENTS 58-24616 2/1983 Japan .

*Primary Examiner*—Thomas R. Hannon
*Attorney, Agent, or Firm*—Basile and Hanlon

[57] ABSTRACT

A housing has a vertically extending cylindrical bore, with a radical bearing surface formed on the inner peripheral surface, and a thrust bearing surface formed on the inner bottom surface of the cylindrical bore. A shaft member which is supported rotatably in the cylindrical bore of the housing has a radial receiving surface and a thrust receiving surface respectively formed on the outer peripheral surface and the bottom surface. A dynamic pressure generating groove of a spiral shape is formed in at least one of the radial bearing surface and ther radial receiving surface. When the shaft member is rotated, a gas in the housing is sucked by the pumping action of the dynamic pressure generating groove and flows into a pressure chamber between the thrust bearing surface and the thrust receiving surface through a radial space between the radial bearing surface and the radial receiving surface. The pressure in the pressure chamber maintains the shaft member in a floating position by a predetermined amount. The shaft member has a passage bore formed along a center axis line. The passage bore includes a restricted aperture of a smaller diameter which opens at the thrust receiving surface of the shaft member to thereby allow the gas in the pressure chamber to be exhausted into the housing through the passage bore.

6 Claims, 5 Drawing Sheets

DYNAMIC PRESSURE TYPE FLUID BEARING DEVICE

BACKGROUND OF THE INVENTION

1. Field of the Invention

The present invention relates to a dynamic pressure type fluid bearing device which is used in business equipment, video equipment, measurement equipment, and the like.

2. Description of the Prior Art

Equipment which uses a bearing device similar to this invention, for example, a scanner unit for a laser printer shown in FIG. 5, is known. In this scanner unit, one end of a shaft member 2 is secured to a base 1a of a housing. A sleeve 3 fitted about the shaft member 2 is supported radially through a dynamic pressure type radial fluid bearing formed by a bore surface of the sleeve 3 and an outer surface of the shaft member 2 which has a dynamic pressure generating groove formed in the outer surface thereof. A thrust receiver 5 having an exhaust bore 5a is attached to one end (the upper end in FIG. 5) of the sleeve 3. The sleeve 3 is supported axially by a dynamic pressure type fluid bearing constituted by a lower surface of the thrust receiver 5 and an end face of the shaft member 2 opposed to the lower surface.

The sleeve 3 has a flange 3a. A polygonal mirror 6 is fitted on an outer peripheral surface of the sleeve 3 above the flange 3a so that the polygonal mirror 6 is sandwiched between a fixing ring 7a and the flange 3a, respectively, at an upper surface and a lower surface of the polygonal mirror 6.

A window 8 of a transport material is provided at a position on a side wall 1b of the housing 1 opposing the polygonal mirror 6 in a horizontal direction.

Furthermore, the sleeve 3 has a step portion at a position below the flange 3a. An upper surface of a rotor magnet 9a which is fitted about the outer peripheral surface of the sleeve 3 is held by the step portion. A lower surface of the rotor magnet 9a abuts against a fixing ring 7b so that the rotor magnet 9a is sandwhiched between the step portion and the fixing ring 7b. A stator coil 9b radially opposing the rotor magnet 9a is attached to a side wall 1c of the housing 1. The rotor magnet 9a and the stator coil 9b constitute a peripheral-surface opposing type driving motor.

In the scanner unit described above, when the sleeve 3 is rotated by the operation of the driving motor while being supported by the shaft member 2, a laser beam incident onto the polygonal mirror 6 is reflected from the mirror 6 and passes through the window 8 so that an object (not shown), such as a photosensitive drum or the like, placed outside is illuminated.

In the bearing device described above, the shaft member 2 is stationary and the sleeve 3, accessory parts including the polygonal mirror 6 attached to the sleeve 3, and the rotor magnet 9a, etc., constitute a rotary member is inclusively.

Since the bearing device is used at high rotational speeds, it is an indispensable requirement to correct an unbalance in weight in a radial direction.

However, the correction of this radial weight unbalance is performed after the polygonal mirror 6, the rotor magnet 9a and the like are attached to the sleeve 3 by rotating the sleeve 3 about a center axis line while holding the sleeve 3 horizontally and holding the outer peripheral surfaces of opposite end portions of the sleeve 3. Accordingly, the outer peripheral surfaces of the sleeve 3 are references for the correction.

On the other hand, during use of the bearing device, the sleeve 3 rotates with respect to a reference position defined by the bore surface.

For this reason, both the bore surface and the outer peripheral surface of the sleeve 3 are required to be machined with high accuracy so that both axis lines of the bore surface and the outer peripheral surface coincide exactly with each other, that is, to insure coaxiality. As a result, a drawback is involved in that the machining cost is increased.

Furthermore, in a bearing device of this type, it is desired to reduce the weight of the rotary member as far as possible to reduce the thrust load, and at the same time, to reduce the starting time.

Moreover, a thrust bearing formed between the thrust receiver 5 and the shaft member 2, and the radial bearing formed between the sleeve 3 and the shaft member 2 are fluid bearings of the dynamic pressure type with a gas, such as air, used as a lubricating fluid. During rotation of the rotary member, although the sleeve 3 rotates in a non-contacting condition with respect to the shaft member 2, due to a pumping action of the dynamic pressure generating grooves 4 formed in an outer peripheral surface of the shaft 2, at the start and stop conditions of the rotary member, the sleeve 3 and the shaft 2 are in contact with each other. However, since the gas, such as air, used as the lubricating fluid is inferior in lubricating properties to other lubricants, at the start and stop conditions of the rotary members, considerable damage is caused on a radial bearing surface of the sleeve 3 which is the contact surface between the sleeve 3 and shaft 2, and on the thrust bearing surface of the thrust receiver 5.

In order to prevent such damage on the bearing surfaces, the sleeve 3 is formed of a metal material which is subjected to cutting work and applied in a film, such as by plating, so as to have an excellent sliding property. Furthermore, the thrust receiver 5 is formed by cutting a metal material and injection molding a synthetic resin having an excellent sliding property on a surface of the metal material integrally therewith.

However, applying such a surface treatment to the sleeve 3 and the thrust receiver 5 not only increases the manufacturing cost but a drawback is involved since the sleeve 3 and the thrust receiver 5 are separate members. Press fitting, shrinkage fitting, or the like is required in assembling which is troublesome and time consuming.

Furthermore, in a bearing device of this type, the polygonal mirror 6 is mounted by the fixing ring 7a used exclusively for this purpose. As a result, there is a drawback in that the number of parts increases.

SUMMARY OF THE INVENTION

The present invention removes the various drawbacks mentioned above and meets the needs mentioned above. It is a primary object of the invention to provide a dynamic pressure type fluid bearing device which does not require highly accurate coincidence of the axis lines of the inner and outer peripheral surfaces of a housing, and which has reduced-weight rotary members.

Another object of the present invention is to provide a dynamic pressure type fluid bearing which provides a suitable performance when implemented in a scanner unit for a laser printer having a polygonal mirror.

In order to achieve these objects, in the present invention, a structure is employed in which a housing, which is a stationary member, rotatably supports a shaft member.

In a first embodiment of the invention, a dynamic pressure type fluid bearing comprises a housing formed with a cylindrical bore having a cylindrical radial bearing surface and a thrust bearing surface, a shaft member disposed in the cylindrical bore and having a cylindrical radial receiving surface opposing the radial bearing surface and a thrust receiving surface opposing the thrust bearing surface, a pressure chamber formed between the thrust receiving surface and the thrust bearing surface, and a dynamic pressure generating groove formed in at least one of the radial bearing surface and the radial receiving surface, the dynamic pressure generating groove causing a gas in a gap between the radial bearing surface and the radial receiving surface to flow into the pressure chamber during rotation of the shaft member.

The shaft member has a passage bore at a center portion of the thrust receiving surface, which passage bore has an opening at an end face of the shaft member axially opposite to the thrust receiving surface. The passage bore has a restricted aperture formed at the thrust receiving surface side, which restricted hole has a small diameter compared with that of other parts. An annular contact surface is formed on the thrust receiving surface around the restricted aperture so that the thrust bearing surface is in contact with the annular contact surface when the shaft member is stationary.

The passage bore is provided with a step portion, and any unbalance of weight of the rotary members in radial directions can be corrected by attaching an adhesive to the step portion.

When a polygonal mirror is to be mounted to the shaft member, it is preferably that a flange portion is provided on the shaft member at an end opposite to the thrust receiving surface. The polygonal mirror is, thus, sandwiched between the flange and a yoke for mounting a rotor magnet.

The housing may preferably be formed by an outer cylinder made of a metal and an inner cylinder made of a synthetic resin and intergrally molded on an inner surface of the outer cylinder. The radial bearing surface and the thrust bearing surface are formed in the cylindrical bore of the inner cylinder, and the dynamic pressure generating groove is formed in the radial bearing surface.

In another embodiment of the present invention, in a dynamic pressure type fluid bearing apparatus, a cylindrical bore formed in a housing has a cylindrical radial bearing surface and a thrust bearing surface, a shaft member disposed in the cylindrical bore, a radial receiving surface opposing the radial bearing surface and a thrust receiving surface opposing the thrust bearing surface, and at least one of the radial bearing surface and the radial receiving surface is formed with a groove for generating a dynamic pressure. A polygonal mirror fitted to the shaft member is sandwiched and secured between a flange provided on an end portion of the shaft member opposite to the thrust receiving surface and a yoke having a rotor magnet fixed thereto. A stator coil is disposed opposing the rotor magnet.

It is preferable that the housing includes an outer cylinder made of a metal, and an inner cylinder made of a synthetic resin integrally formed on an inner surface of the outer cylinder. The radial bearing surface and the thrust bearing surface are formed on a cylindrical bore of the inner cylinder, and the dynamic pressure generating groove is formed in the radial bearing surface.

In the first embodiment of the invention, since the shaft member, which is a rotary member, is disposed in the cylindrical bore of the housing which is a stationary member, the coaxiality between an outer peripheral surface of the housing and an inner peripheral surface of the cylindrical bore of the housing is not required to be highly accurate.

Furthermore, since the passage bore through the shaft member has openings respectively at axial opposite ends thereof, forming the passage bore with a large diameter causes the weight of the shaft member to be reduced.

A step portion provided in the passage bore of the shaft member can be used as a surface to attach an adhesive for correcting a radial unbalance of weight of the rotary member including the shaft member.

By fixedly sandwhiching a polygonal mirror between a flange portion provided at an end opposite to a thrust receiving surface of the shaft member and a yoke for mounting a rotor magnet, the number of mounting members used exclusively for mounting the polygonal mirror can be reduced.

By forming the housing of an outer cylinder made of a metal, and an inner cylinder made of a synthetic resin and formed integrally with the inner surface of the outer cylinder, and, further, by forming the radial bearing surface and the thrust bearing surface on the cylindrical bore, and by providing a dynamic pressure generating groove in the radial bearing surface, damage to the rotating member at the time of starting and stopping is reduced.

In the other embodiment of the invention, since a shaft member which is a rotary member is disposed in the cylindrical bore of the housing which is a stationary member, the coaxiality of the outer surface of the housing and the inner surface of the cylindrical hole of the housing is not required to be formed with high precision.

Since a polygonal mirror is secured between a flange portion provided at an end opposite to a thrust receiving surface of the shaft member and a yoke mounting a rotor magnet, the number of mounting members used exclusively for mounting the polygonal mirror can be reduced.

By forming the housing of an outer cylinder made of a metal and an inner cylinder made of a synthetic resin and formed integrally with the inner surface of the outer cylinder, and, further, by forming the radial bearing surface and the thrust bearing surface on the cylindrical bore, and by providing a dynamic pressure generating groove in the radial bearing surface, damage to the rotating members at the time of starting and stopping is reduced.

DESCRIPTION OF THE PREFERRED EMBODIMENTS

Figure 1:
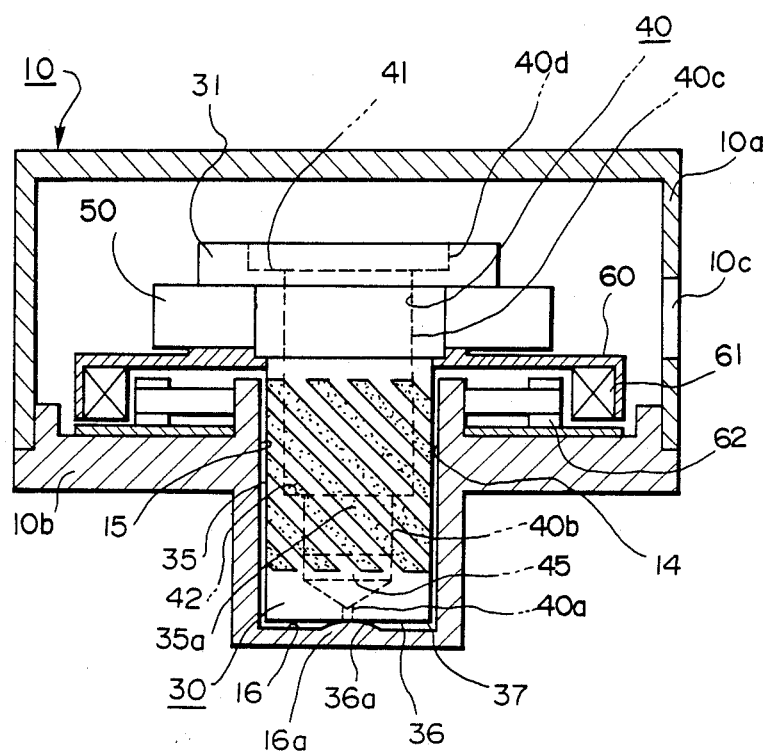
FIG. 1 is a sectional side view illustrating a first embodiment in which the present invention is applied to a scanner unit for a laser printer.

With reference to FIG. 1 which illustrates a first embodiment in which the present invention is applied to a scanner unit for a laser printer, a housing 10 includes an upper member 10a and a lower member 10b, and has a structure for sealing a gas, such as air, therein. The lower member 10b is formed with a cylindrical bore 14. The cylindrical bore 14 is provided with a radial bearing surface 15 of a cylindrical shape on an inner peripheral surface, and a thrust bearing surface 16 has a protruded portion 16a of a convex spherical shape formed on a central portion of an inner bottom surface.

A shaft member 30 is disposed in the cylindrical bore 14 of the housing 10. A radial receiving surface 35 opposed to the radial bearing surface 15 is formed on an outer peripheral surface of the shaft member 30. A dynamic pressure generating groove 35a of a spiral shape is formed in the radial receiving surface 35. A thrust receiving surface 36 of a flat plane shape which opposes the thrust bearing surface 16 is formed on one end face of the shaft member 30. A pressure chamber 37 is formed in a space between an outer circumferential portion of the thrust bearing surface 16.

A passage bore 40 formed in the shaft member 30 substantially along the axial center thereof includes a restricted aperture 40a opening at a center portion of the thrust receiving surface 36, a small diameter aperture 40b, an intermediate diameter aperture 40c, and a large diameter aperture 40d, which apertures respectively have diameters gradually increasing from the restricted aperture 40a towards the opposite end of the thrust receiving surface 36. In the passage bore 40, the restricted aperture 40a has the smallest diameter as compared with the other apertures.

The thrust receiving surface 36 of the shaft member 30 has an annular contact surface 36a surrounding the opening of the restricted aperture 40a. The annular contact surface 36a is in contact with the protruding portion 16a of the thrust receiving surface 16 when the shaft member 30 is at rest.

A flange portion 31 is provided at an upper end of the shaft member 30. A polygonal mirror 50 fitted about the outer peripheral surface of the shaft member 30 is fixedly sandwiched between the flange portion 31 and a yoke 60. The shaft member 30, the flange portion 31, the polygonal mirror 50, and the yoke 60 constitute a rotary member. A through bore is formed in the flange portion 31 and another through bore is formed in the polygonal mirror 50. A bolt which penetrates through the two through bores is screwed into a threaded portion of the yoke 60 (not shown).

An annular shaped rotor magnet 61 is mounted on the yoke 60. A stator coil 62 opposing the rotor magnet in the radial direction is mounted on the lower member 10b of the housing 10.

A window 10c made of a transparent material is provided on the upper member 10a of the housing 10 at a position opposing the polygonal mirror 50 in a horizontal direction.

The scanner unit is structured as described above, and when the shaft member 30 rotates, a gas within the housing 10 is sucked into a radial space between the radial bearing surface 15 and the radial receiving surface 35 due to a pumping action of the dynamic pressure generating groove 35a, and flows into the pressure chamber 37. The gas flows upwardly from the pressure chamber 37 into the passage bore 40 via the restricted aperture 40a, and is discharged into the housing 10 through the large diameter aperture 40d. The pressure of this gas in the pressure chamber 37 is adjusted appropriately depending on the amount of floating of the shaft member 30. The shaft member 30 rotates without contacting the thrust bearing surface 16 while maintaining a constant minute amount of floating due to the gas pressure. Also, since a certain gas pressure is similarly generated in a radial space between the radial bearing surface 15 and the radial receiving surface 35, the shaft member 30 rotates without contacting the radial bearing surface 15.

The restricted aperture 40a which opens at the thrust receiving surface 36 has the smallest diameter in the passage bore 40. In this respect, when the diameter of the restricted aperture 40a is increased, the effect of restricting the gas is decreased and a thrust loading capability is decreased. Furthermore, an outer diameter of the contact surface 36a with respect to the thrust bearing surface 16 of the thrust receiving surface 36 at the time of rest of the shaft member 30 is increased to cause an increase in the starting torque. Thus, an increase in the diameter of the restricted aperture 40a is not desirable. However, as to the small diameter aperture 40b, the intermediate diameter aperture 40c and the large diameter aperture 40d, other than the restricted aperture 40a, it is easy to machine these apertures to have inner diameters of desired size by die casting, or foregoing, or by inserting a cutting machine tool from the end face of the shaft member 30 opposite to the thrust receiving surface 36. These inner peripheral surfaces can be utilized to correct a weight unbalance of the rotary member including the shaft member 30 in the radial direction.

In this embodiment, a filter 45 is attached to the small diameter aperture 40b of the passage bore 40. By attaching this filter 45, it is possible to prevent powders, or dust of particles produced by wear at the time of starting and stopping of the shaft member 30 from scattering into the housing 10.

Furthermore, in the passage bore 40 of the shaft member 30, a step portion 41 is formed at a connection portion between the large diameter aperture 40d and the intermediate aperture 40c, and a step portion 42 formed at a connection portion between the intermediate aperture 40c and the small diameter aperture 40b can be utilized as an attaching surface for an adhesive used for correction of weight unbalance of the rotary member including the shaft member 30 in the radial direction. Furthermore, the attached adhesive can be prevented from scattering due to the centrifugal force generated when the shaft member 30 is rotating.

In this embodiment, since the yoke 60 which mounts the rotor magnet 61 is used as a mounting member of the polygonal mirror 50, the number of mounting members used exclusively for the polygonal mirror 50 can be reduced.

Moreover, when the rotor magnet 61 and the stator coil 62 constituting the driving motor are of the peripherally opposing type, the attraction force between the rotor magnet 61 and the stator coil 62 does not act as a thrust load, and thus, it serves to prevent wear of the thrust bearing surface 16.

In addition, the dyanamic pressure generating groove 35a formed in the radial receiving surface 35 of the shaft member 30 in the above embodiment may be formed in the radial bearing surface 15 of the cylindrical bore 14 of the housing 10, or the groove 35a may be formed in both the radial receiving surface 35 of the shaft member 30 and the radial bearing surface 15 of the cylindrical bore 14.

Furthermore, while the protruding portion 16a may not be formed on the thrust receiving surface 16, a protruding portion may be formed on the thrust receiving surface 36.

When the generation of particles due to wear is expected to be small in quanity at the time of starting and stopping, the filter 45 may be omitted.

Moreover, a dynamic pressure generating groove may be formed in at least one of the thrust bearing surface 16 of the cylindrical bore 14 of the housing 10 and the thrust receiving surface 36 of the shaft member 30 to form a so-called plane groove type thrust bearing. In this case, the through bore 40 including the restricted aperture 40a formed in the shaft member 30 may be omitted.

The housing 10 per se may also be formed as a unit of a non-enclosed type, and this unit may be accomodated in another apparatus of an enclosed type.

Moreover, in this embodiment, the flange portion 31 of the shaft member 30 is formed integrally with a shaft portion by die casting, forging, or by cutting work. However, a separate flange portion may be secured to the shaft portion by press-fitting, or by shrinkage-fitting.

Furthermore, in order to reduce deformation of the polygonal mirror at the time of mounting, a sheet-like seat member made of a metal or a non-metallic material, such as synthetic resin, may be inserted between the polygonal mirror 50 mounted on the shaft member 30 and the yoke 60.

Figure 2:
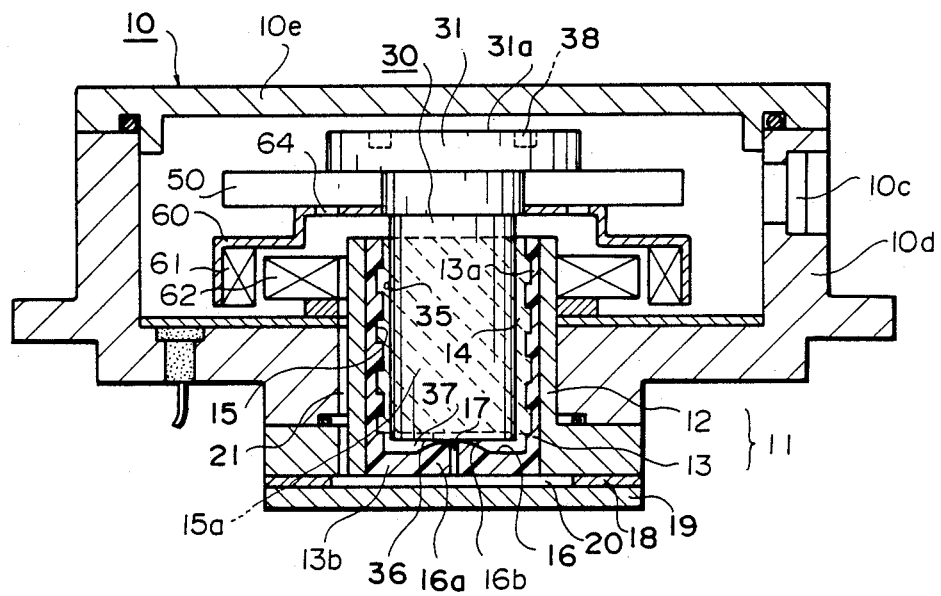
FIG. 2 is a sectional side view illustrating a second embodiment in which the present invention is applied to a scanner unit for a laser printer.

FIG. 2 shows a second embodiment of the invention in which the present invention is applied to a scanner unit for a laser printer.

A housing 10 has a structure in which an upper wall member 10e and and a sleeve member 11 are joined airtightly to a side wall member 10d. The sleeve member 11 is comprised of an outer cylinder 12 made of a metal, such as an aluminum alloy, zinc alloy, etc., and an inner cylinder 13 made of a synthetic resin and integrally formed on an inner surface of the outer cylinder 12. The inner cylinder 13 is comprised of a trunk portion 13a of a cylindrical shape and a bottom portion 13b. The inner cylinder 13 is bonded to the inner surface of the outer cylinder 12 by placing the outer cylinder coated with an adhesive on the inner peripheral surface in a molding die, and a synthetic resin material is injection molded. An inner peripheral surface of a cylindrical bore 14 formed in the trunk portion 13a of the inner cylinder 13 constitute a radial bearing surface 15, and a dynamic pressure generating groove 15a is formed in the radial bearing surface 15 by the molding die used for the injection mold. A thrust bearing surface 16 has a protruded portion 16a of a convex spherical shape formed at a center portion of a bottom portion 13b of the inner cylinder 13. A restricted aperture 17 formed substantially at a center of the bottom portion 13a in an axial direction has an opening at a center portion of the thrust receiving surface 16.

As a molding material of the inner cylinder 13 of the sleeve member 11, it is preferable to use a synthetic resin having an excellent self-lubricating property.

Furthermore, at the outer bottom surface of the sleeve member 11, a pressing member 19 is airtightly attached through an elastic member 18 which is attached to an annular bottom surface of the sleeve member 11. A space 20 formed between the sleeve member 11, and the pressing member 19 is in communication with a passage groove 21 formed between an outer peripheral surface of the outer cylinder 12 and an inner peripheral surface of the side wall member 10d. An upper end of the passage groove 21 opens to the inside of the housing 10.

A shaft member 30 having a flange portion 31 at an upper end thereof is disposed in the cylindrical bore 14 of the sleeve 11. A radial receiving surface 35 opposing to the radial bearing surface 15 is formed in an outer peripheral surface of the shaft member 30, and a thrust receiving surface 36 opposing to the thrust bearing surface 16 is formed in an end surface of the shaft member 30. A pressure chamber 37 is formed between an outer circumferential portion of the thrust receiving surface 36 and an outer circumferential portion of the thrust bearing surface 16. An annular contact surface 16b is formed on the thrust bearing surface 16 surrounding the opening of the restricted aperture 17. The contact surface 16b is in contact with the thrust receiving surface 36 when the shaft member 30 is at rest.

As a material for the shaft member 30, an aluminum alloy which is light, rust-resistant, and workable, or an aluminum alloy having the surface subjected to hardening treatment is preferable; however, a stainless steel may also be used.

A polygonal mirror 50 fitted about an outer peripheral surface of the shaft member 30. The upper and lower surfaces of the polyhedral mirror 50 are sandwhiched between the flange portion 31 of the shaft member 30 and a yoke 60 in the same way as in the first embodiment. An annular rotor magnet 61 mounted on the yoke 60 radially opposes a stator coil 62 which is fitted about and mounted on the sleeve member 11. Furthermore, a window 10c of a transparent material is provided in the side wall member 10d at a position horizontally opposing the polygonal mirror 50.

A circular groove 38 is formed in an upper end surface 31a of the shaft member 30, and a plurality of through bores 64 are formed circumferentially in the yoke 60 at a mounting portion of the polygonal mirror 50. An adhesive agent is coated in the circumferential groove 38 and the through bores 64 to correct weight unbalance in the radial direction.

In the scanner unit arranged as described above, when the shaft member 30 rotates, a pumping action is generated by the dynamic pressure generating groove 15a, and a gas within the housing 10 is sucked into a radial space between the radial bearing surface 15 and the radial receiving surface 35 and flows into the pressure chamber 37. As a result, the shaft member 30 floats due to the gas pressure in the pressure chamber 37. When the shaft member 30 floats, the restricted aperture 17 opens to the pressure chamber 37, and the gas flowing into the pressure chamber 37 flows upwardly in the passage groove 21 through the restricted aperture 17 and the space 20, and is then exhausted into the housing 10. The gas pressure in the pressure chamber 37 is adjusted appropriately by the amount of floating of the shaft member 30, and the shaft member 30 is rotated while maintaining a constant amount of float by the gas pressure.

When the shaft member 30 is at rest, the thrust receiving surface 36 of the shaft member 30 is in contact with the annular contact surface 16b of the protruding portion 16a of the thrust bearing surface 15. As a result, the starting torque is small at the time of starting and even when the precision of finishing of the thrust receiving surface 36 is somewhat low, non-uniform contact of the thrust receiving surface 36 does not occur.

Furthermore, at the time of starting and stopping of the shaft member 30, since the synthetic resin which forms the radial bearing surface 15 of the sleeve member 11 and the thrust bearing surface 16 are in contact with the shaft member 30, damage of these bearing surfaces 15 and 16 is not severe. When the inner cylinder 13 is formed by a synthetic resin having an excellent self-lubricating property, damage of the bearing surfaces 15 and 16 at the time of starting and stopping can be reduced further.

In this embodiment, a dynamic pressure generating groove may be formed at least one of the thrust bearing surface 16 of the sleeve member 11 and the thrust receiving surface 36 of the shaft member 30 to thereby form so-called plain groove type thrust bearing. In this case, the restricted aperture 17 formed in the thrust bearing surface 16, and the space 20 and the passage groove 21 formed in the bottom surface of the sleeve member 13 and the outer peripheral surface of the outer cylinder, 12 can be omitted.

Although the side wall member 10d and the outer cylinder 12 of the housing 10 are separate members in this embodiment, the side wall member 10d and the outer cylinder 12 may be formed as a unitary part by die casting as an outer cylinder 12. In this case, the number of components is reduced and the assembling work becomes simple.

Furthermore, when a sheet-like member of a synthetic resin having a sliding property is bonded to the thrust bearing surface 16, or the sheet-like member is formed integrally with the inner cylinder 13, it is possible to use as a material of the inner cylinder 13 a synthetic resin which is easy to maintain in size accuracy at the time of injection molding even when the slidability of the radial bearing surface 15 is somewhat unsatisfactory.

Figure 3:
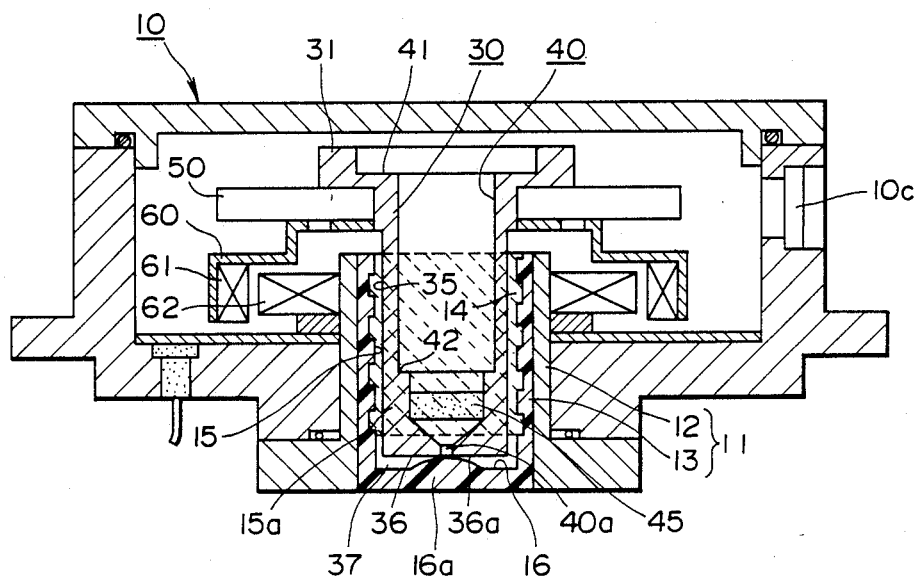
FIG. 3 is a sectional side view illustrating a third embodiment in which the present invention is applied to a scanner unit for a laser printer.

FIG. 3 shows a third embodiment of the invention which is most suitable for a scanner unit for a laser printer.

A housing 10, similar to the second embodiment, includes an outer cylinder 12 made of a metal and an inner cylinder 13 made of a synthetic resin which is integrally formed on an inner surface of the outer cylinder 12. A radial bearing surface 15 and a thrust bearing surface 16 are formed in a cylindrical bore 14 of the inner cylinder 13, and a spiral-shaped dynamic pressure generating groove 15a is formed in the radial bearing surface 15. The thrust bearing surface 16 has a protruded portion 16a of a convex spherical shape at a central portion.

The shaft member 30, similar to the first embodiment, is formed with a passage bore 40 which opens at a thrust receiving surface 36 and at an end face opposite to the thrust receiving surface 36. A restricted aperture 40a which opens to the thrust receiving surface 36 has a smaller diameter as compared with other portions of the passage bore 40.

A space formed between an outer circumferential portion of the thrust bearing surface 16 and an outer circumferential portion of the thrust receiving surface 36 constitutes a pressure chamber 37. A portion on the thrust receiving surface 36 surrounding the opening of the restricted aperture 40a is a contact surface 36a of an annular shape which is in contact with the protruded portion 16a of the thrust bearing surface 16 when the shaft member 30 is at rest.

The structure of the other parts is the same as that in the first and second embodiments, and, as such, like reference numerals are used for like parts and the explanation thereof is omitted.

In the scanner unit structure as described above, when the shaft member 30 rotates, a pumping action is generated due to the dynamic pressure generating groove 15a formed in the radial bearing surface 15, and a gas which flows into the pressure chamber 37 from a space between the radial bearing surface 15 and the radial receiving surface 35 flows further upwardly in the passage bore 40 via the restricted aperture 40a of the shaft member 30, and is then exhausted within the housing 10.

Figure 4:
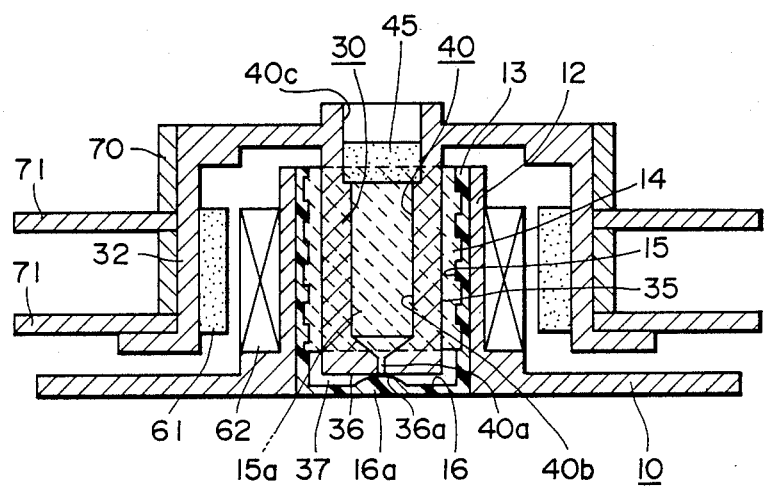
FIG. 4 is a sectional side view illustrating another embodiment in which the present invention is applied to a magnetic disk memory device.
Figure 5:
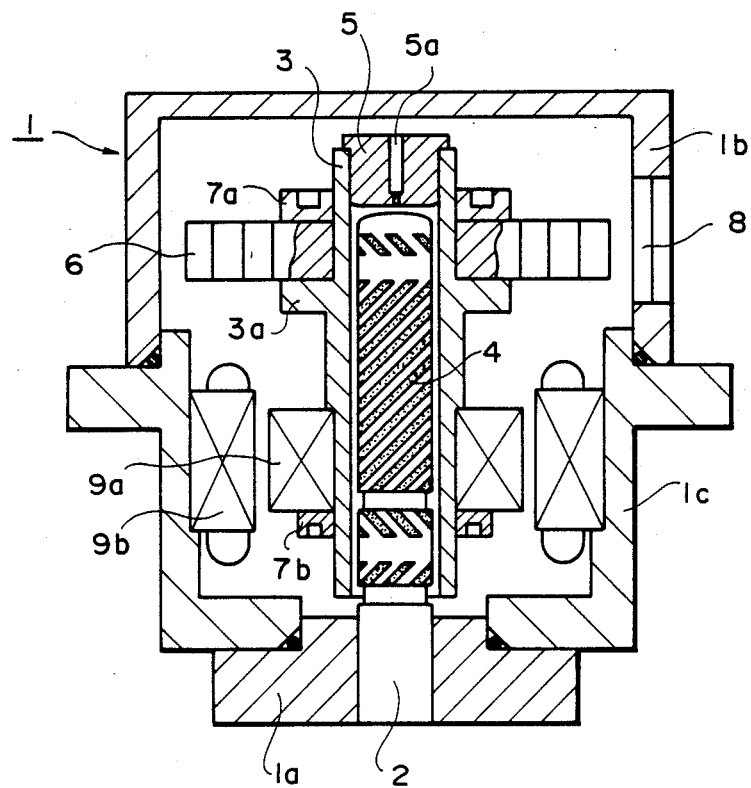
FIG. 5 is a longitudinal sectional view showing a dynamic-type fluid bearing device in a prior art scanner unit for a laser printer.

FIG. 4 shows another embodiment in which the present invention is applied to a magnetic disk memory device.

A housing 10 which is a stationary member is comprised of an outer cylinder 12 made of a metal and an inner cylinder 13 made of a synthetic resin and integrally formed on an inner surface of the outer cylinder 12. A cylindrical bore 14 formed in the inner cylinder 13 has a radial bearing surface 15 on an inner peripheral surface, and a thrust bearing surface 15 on an inner peripheral surface, and a thrust bearing surface 15 of a plain shape formed on an inner bottom surface. A dynamic pressure generating groove 15a of a spiral shape is formed in the radial bearing surface 15 and a protruding portion 16a of a convex spherical shape is formed at a center portion of the thrust bearing surface 16. It is preferable to use an aluminum alloy or a zinc alloy as a metallic material for the outer cylinder 12, and to use a synthetic resin having an excellent self-lubricating property as a synthetic resin material for the inner cylinder 13.

A shaft member 30 which is a rotary member, is fitted into the cylinder bore 14 of the inner cylinder 13, and a hub portion 32 is integrally formed on an outer peripheral surface of the shaft member 30.

The shaft member 30 has on the outer peripheral surface thereof a radial receiving surface 35 of a cylindrical shape which opposes the radial bearing surface 15, and has on an end surface thereof a thrust receiving surface 36 of a plain shape which opposes the thrust bearing surface 16. A contact surface 36a of an annular shape is formed at a center portion of the thrust receiving surface 36. The contact surface 36a is in contact with the protruding portion 16a of the thrust bearing 16 when the shaft member 30 is at rest. A pressure chamber 37 is formed between an outer circumferential portion of the thrust receiving surface 36 and an outer circumferential portion of the thrust bearing surface 16.

The shaft member 30 also has a passage bore 40 formed substantially along a center axis. The passage bore 40 includes a restricted aperture 40a having a small diameter and opening at the center of the annular contact surface 36a of the thrust receiving surface 36, and apertures 40b and 40c having a larger diameter than the restricted aperture 40a. The apertures 40b and 40c are in communication with the restricted aperture 40a, and the aperture 40c has an opening at an end surface of the shaft member 30 opposite to the thrust receiving surface 36. A filter 45 is attached to a step portion in the passage bore 40 between the apertures 40b and 40c to prevent particles produced by wear at the time of starting and stopping from circulating past the passage hole 40.

As a material for the shaft member 30 and the hub portion 32 constituting the rotary member, an aluminum alloy or zinc alloy which is light in weight and excellent in workability is used.

A rotor magnet 61 is mounted on an inner peripheral surface of the hub portion 32 of the shaft member 30, and a stator coil 62 opposing the rotor magnet 61 radially through a space is mounted on an outer peripheral surface of the outer cylinder 12 of the housing 10 to thereby form a driving motor of a peripherally opposing type.

A plurality of magnetic disks 71 are attached to an outer peripheral surface of the hub portion 32 of the shaft member 30 through an attaching member 70.

A case (not shown) is mounted on the housing 10, and a bearing device structured as described above and accessory parts are enclosed in the case. A gas, such as a air, is sealed in the interior of the case.

The operation of the magnetic disk apparatus arranged as described above, when the shaft member 30 is rotated, is the same as in the third embodiment.

In this embodiment, since the rotor magnet is mounted on the inner peripheral surface of the hub portion 32 which is integral with the rotary member, and the stator coil radially opposing the rotor magnet is mounted on the outer peripheral surface of the stationary member, it is possible to attach the magnetic disk or the like to the outer peripheral surface of the hub. Thus, the size of the devices in the axial direction of the bearing device can be reduced to make it more compact.

Moreover, since the rotary member and the hub portion are integrally formed with each other, it is easy to maintain a working accuracy and the working cost is reduced.

Since the aluminum alloy or zinc alloy is used as a material for these parts, weight is reduced and the load on the thrust bearing is small. Thus, wear of the thrust bearing surface is reduced. Since the inertia of the rotary member is small, the rise time of the device becomes shorter.

As described in the foregoing, in one aspect of the invention, since a dynamic pressure type fluid bearing device has a structure in which a shaft member is rotated by supported by a cylindrical bore of a housing which is a stationary member, there is no need to work the coaxiality of the inner peripheral surface and the outer peripheral surface with a high precision in order to correct the weight unbalance in the radial direction as in the prior art dynamic pressure type fluid bearing device having a structure in which as sleeve is rotated. As a result, the working cost is of the present invention inexpensive.

Furthermore, since a passage bore is formed in the shaft member in the axial direction and has openings respectively at axial opposite ends of the shaft member, it is possible to reduce the weight of the shaft member by increasing the diameter of the passage bore with the exception of a restriction aperture portion in the passage bore. As a result, the thrust load becomes small, and wear at the time of starting and stopping can be prevented to thereby improve the durability of the device. At the same time, since the inertia is reduced, the rise time of the device becomes shorter.

Moreover, when the inner surface of the passage bore is utilized as an attaching surface for an adhesive agent for correcting the weight unbalance in the radial direction of a rotary member including the shaft member, it is possible to prevent scattering of the attached adhesive agent due to centrifugal force.

When a polygonal mirror is fixedly sandwiched by a flange portion provided at an end of the shaft member and a yoke which has a rotor magnet mounted thereon, the mounting accuracy of the polygonal mirror with respect to the shaft member becomes high, and the number of mounting members used exclusively for the polygonal mirror is reduced and, thus, the number of parts is also reduced.

Moreover, when a radial bearing surface and a thrust bearing surface provided on the cylindrical bore of the housing are integrally formed of a synthetic resin, damage to both bearing surface is reduced. In addition, it is possible to dispense with assembling work which was necessary in the prior art because the sleeve and the thrust receiver were separate members. As a result, mass productivity is improved, and it becomes easy to maintain the required accuracy in the perpendicularity between respective bearing surfaces.

In this case, since the radial bearing surface is formed in the cylindrical bore of an inner cylinder made of a synthetic resin and formed integrally with an outer cylinder made of a metal, the required precision of the radial bearing surface can be easily maintained by injection molding. In addition, when the temperature of the bearing portion rises during use, since the expansion of the synthetic resin is suppressed by the metallic outer cylinder, a change of the size of the inner cylinder is avoided.

In the other embodiment of the invention, in a bearing device in which a shaft member is rotatably supported in a housing through a dynamic pressure type fluid bearing, since a polygonal mirror is sandwiched as fixed between a flange portion provided on one end of the shaft member and a yoke having a rotor magnet mounted thereon, the mounting accuracy of the polygonal mirror with respect to the shaft member is high and the mounting work is simple. As a result, the number of mounting members used exclusively for the polygonal mirror is decreased and, thus, the number of parts is also decreased.

Furthermore, when a radial bearing surface and a thrust bearing surface provided on the cylindrical bore of the housing are integrally formed by a synthetic resin, damage to both bearing surfaces is reduced. In addition, it is possible to dispense with the assembling work which was necessary in the prior art because the sleeve and the thrust receiver were separate members. As a result, mass productivity is improved, and it becomes easy to maintain the required accuracy in the perpendicularity between respective bearing surfaces.

In the case, since the radial bearing surface is formed in the cylindrical bore of an inner cylinder made of a metal, the required precision of the radial bearing surface can be easily maintained by injection molding. In addition, when the temperature of the bearing portion rises during use, since the expansion of the synthetic resin is suppressed by the metallic outer cylinder, a change of the size of the inner cylinder is avoided.

We claim:

1. A dynamic pressure type fluid bearing device comprising:
   a housing formed with a cylindrical bore, said cylindrical bore having a cylindrical radial bearing surface and a thrust bearing surface;
   a shaft member disposed in the cylindrical bore and having a radial receiving surface opposing the radial bearing surface and having a thrust receiving surface opposing the thrust bearing surface;
   a pressure chamber formed between an outer circumferential portion of the thrust receiving surface and an outer circumferential portion of the thrust bearing surface;
   a dynamic pressure generating groove formed in at least one of the radial bearing surface and the radial receiving surface, said dynamic pressure generating groove generating a dynamic pressure to cause a gas in a space between the radial bearing surface and the radial receiving surface to flow into said pressure chamber during rotation of said shaft member;
   said shaft member having a passage bore formed therein along a center axis, said passage bore including a restricted aperture having diameter smaller than that of the other portions of said passage bore and formed at a thrust receiving side thereof, said passage bore having an opening at an end face of said shaft member opposite to the thrust receiving surface; and
   said thrust receiving surface having a contact surface of an annular shape formed surrounding the restricted aperture such that said contact surface is in contact with the thrust bearing surface when said shaft member is at rest.

2. The dynamic pressure type bearing device according to claim 1 wherein said passage bore of said shaft member has as step portion formed therein, and an adhesive agent for correcting a radial weight unbalance of a rotary member including said shaft member is applied to this step portion.

3. The dynamic pressure type bearing device according to claim 1 further comprising: a flange portion provided at an end of said shaft member opposite to the thrust receiving surface; a yoke supporting a rotor magnet; a stator coil positioned opposing said rotor magnet; and a polygonal mirror fitted about said shaft member and sandwiched between said flange portion and said yoke.

4. The dynamic pressure type bearing device according to claim 1 wherein said housing includes an outer cylinder made of a metal, and an inner cylinder made of a synthetic resin and formed integrally on an inner surface of said outer cylinder; and said inner cylinder has the cylinder bore formed thereon on which the radial bearing surface and the thrust bearing surface are provided, the dynamic pressure generating groove being formed in the radial bearing surface.

5. A dynamic pressure type fluid bearing device comprising:
   a housing formed with a cylindrical bore, said cylindrical bore having a cylindrical radial bearing surface and a thrust bearing surface;
   a shaft member disposed in the cylindrical bore and having a radial receiving surface opposing the radial bearing surface and having a thrust receiving surface opposing the thrust bearing surface;
   a dynamic pressure generating groove formed in at least one of the radial bearing surface and the radial receiving surface;
   a flange portion provided at an end of said shaft member opposite to the thrust receiving surface;
   a yoke;
   a polygonal mirror fitted about said shaft member and fixedly sandwiched between said flange portion and said yoke; and
   a rotor magnet mounted on the yoke, a stator coil positioned opposing said rotor magnet.

6. The dynamic pressure type bearing device according to claim 5 wherein said housing includes an outer cylinder made of a metal, and an inner cylinder made of a synthetic resin and integrally formed on an inner surface of said outer cylinder; and said inner cylinder has the cylindrical bore formed thereon on which the radial bearing surface and the thrust bearing surface are provided, the dynamic pressure generating groove being formed in the radial bearing surface.

* * * * *